United States Patent [19]

Wyman et al.

[11] Patent Number: 5,765,871
[45] Date of Patent: Jun. 16, 1998

[54] CHILDREN'S RIDING TOYS

[75] Inventors: Dennis Wyman, Amelia Island, Fla.; David Wyman, Southbury; Lawrence Passick, Brookfield, both of Conn.

[73] Assignee: Empire Industries, Inc., Delray Beach, Fla.

[21] Appl. No.: 907,245

[22] Filed: Aug. 6, 1997

Related U.S. Application Data

[63] Continuation of Ser. No. 697,318, Aug. 22, 1996, abandoned, which is a continuation of Ser. No. 395,481, Feb. 9, 1995, abandoned.

[51] Int. Cl.$^6$ ............................................. B62K 5/02
[52] U.S. Cl. .......................... 280/827; 280/282; 280/62; 280/755; 280/638
[58] Field of Search ........................... 280/827, 828, 280/1.184, 239, 278, 282, 287, 288.4, 293, 304.2, 62, 638, 763.1, 767, 755

[56] References Cited

U.S. PATENT DOCUMENTS

| | | | |
|---|---|---|---|
| 1,623,400 | 4/1927 | Englund | 280/282 |
| 3,096,100 | 7/1963 | Clarke et al. | 280/1.184 |
| 3,874,700 | 4/1975 | Lohr et al. | 280/828 X |
| 3,888,511 | 6/1975 | Parrilla | 280/239 |
| 4,168,846 | 9/1979 | Carren | 280/278 |
| 4,582,335 | 4/1986 | Paioli et al. | 280/278 |
| 4,909,537 | 3/1990 | Tratner | 280/278 |
| 5,071,150 | 12/1991 | Conrad | 280/282 X |

*Primary Examiner*—Kevin Hurley
*Attorney, Agent, or Firm*—Laff, Whitesel, Conte & Saret, Ltd.

[57] ABSTRACT

A tricycle has a fourth and rear supporting wheel at a distance from and a position above the usual rear tricycle wheels so that the tricycle may be tipped to raise to simulate a wheelie. The distance between the usual rear tricycle wheels and the front wheel is adjustable, so that the maximum wheelie angle may be selected according to the child's age and proficiency. The seat may be moved to make it easier or more difficult to tip the tricycle when the child shifts his body and, therefore, the center of gravity.

4 Claims, 7 Drawing Sheets

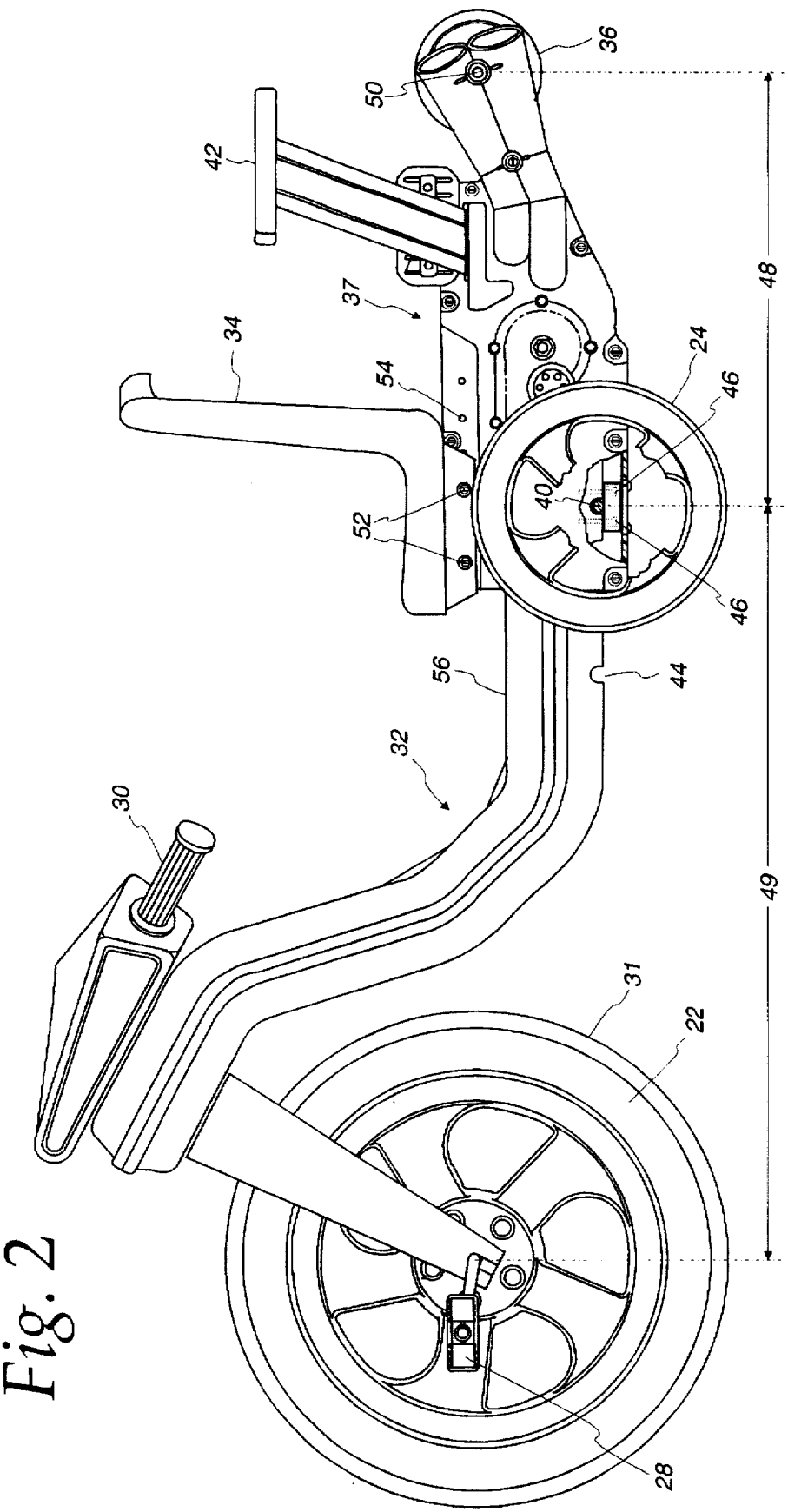

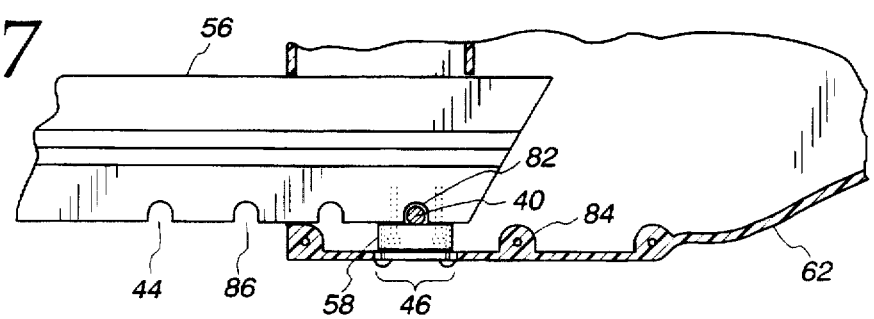
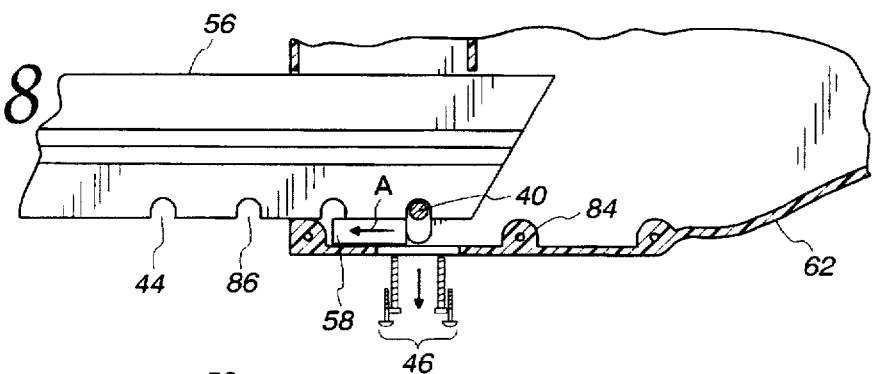
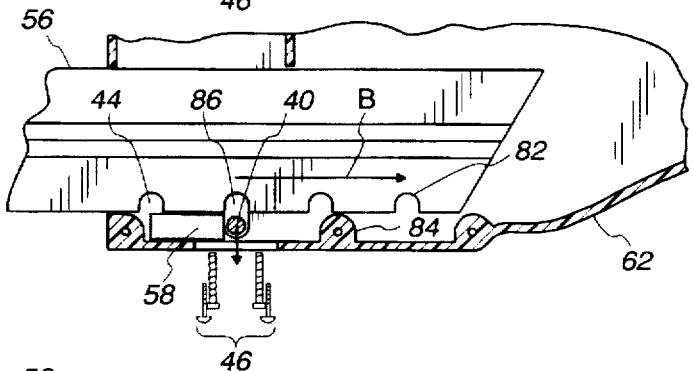
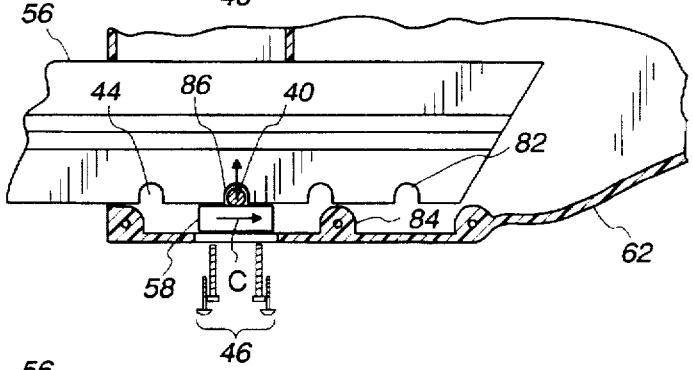
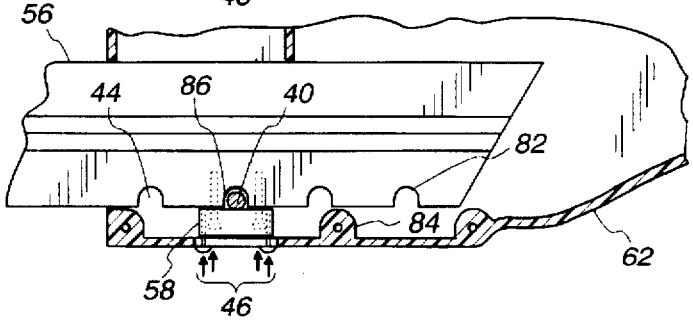

CHILDREN'S RIDING TOYS

This application is a continuation of U.S. patent application Ser. No. 08/697,318, filed Aug. 22, 1996, now abandoned, which was a continuation of Ser. No. 08/395,481 filed Feb. 9, 1995, now abandoned.

BACKGROUND OF THE INVENTION

1. Field of the Invention

This invention relates to children's riding toys and more particularly to tricycles and tricycle-like vehicles having new and novel means for and methods of holding a child's interest.

2. Description of the Prior Art

Tricycles are, of course, well known foot powered devices with three wheels which enable a child to propel himself in a safe manner over limited distances. One of the great appeals of the tricycle to many a child is that he can pretend to be doing something other than propelling himself over short distances. He can pretend that he is riding a horse, in an automobile or airplane, or almost anything else that his mind can grasp. However, after a while, the child loses interest and no longer spends very much time on his tricycle.

Then, it becomes important to add some features to the tricycle in order to generate more impetus to pretending. These add-ons may take many forms, such as altering the appearance to make the tricycle look like a tractor, racing car, motorcycle, or the like. An appearance of a motorcycle is particularly appealing since a tricycle is more like it than like the other alternatives.

Children of this age have seen motorcycles, or their big brother's bicycles, performing "wheelies" which is a maneuver whereby the front wheel leaves the ground and the bicycle or motorcycle sits on only the back wheel while being propelled forward. The child would like to do the same on his tricycle, but at his young age he does not have either the physical strength or the coordination to control the maneuver of such a vehicle riding on only its back wheels.

SUMMARY OF THE INVENTION

Accordingly, an object of the invention is to provide a tricycle which is safe if a child who is sitting on it performs a wheelie. Here, an object is to provide a four-wheeled vehicle which can toggle back and forth between two stable positions with the action being between a normal position and a second or wheelie position which raises a front wheel in simulation of a wheelie. In this connection, an object is to provide such a vehicle which is, at all times, safe, for children.

Another object is to provide a tricycle of the described type, which may be adjusted to accommodate the child, as he grows physically and as his proficiency increases.

BRIEF DESCRIPTION OF THE DRAWINGS

A preferred embodiment for accomplishing these ends is shown in the attached drawings wherein:

FIG. 2 is a side elevation of the inventive tricycle with parts removed to show some of the construction at the back;

FIG. 7 is a fragmentary side elevation, with parts sectioned, showing the relationship of the two parts forming the tricycle frame in one position of adjustment relative to each other.

FIG. 8 is a view similar to FIG. 7, showing a first step of decoupling the frame parts from each other.

FIG. 9 is a view similar to FIG. 7, showing a second step of decoupling the frame parts from each other.

FIG. 10 is a view similar to FIG. 7, showing the recoupling the frame parts to each other in a different position of adjustment relative to each other.

FIG. 11 is a view similar to FIG. 7, showing the frame parts recoupled to each other in the different position of adjustment relative to each other.

DESCRIPTION OF THE PREFERRED EMBODIMENT

Figure 1:
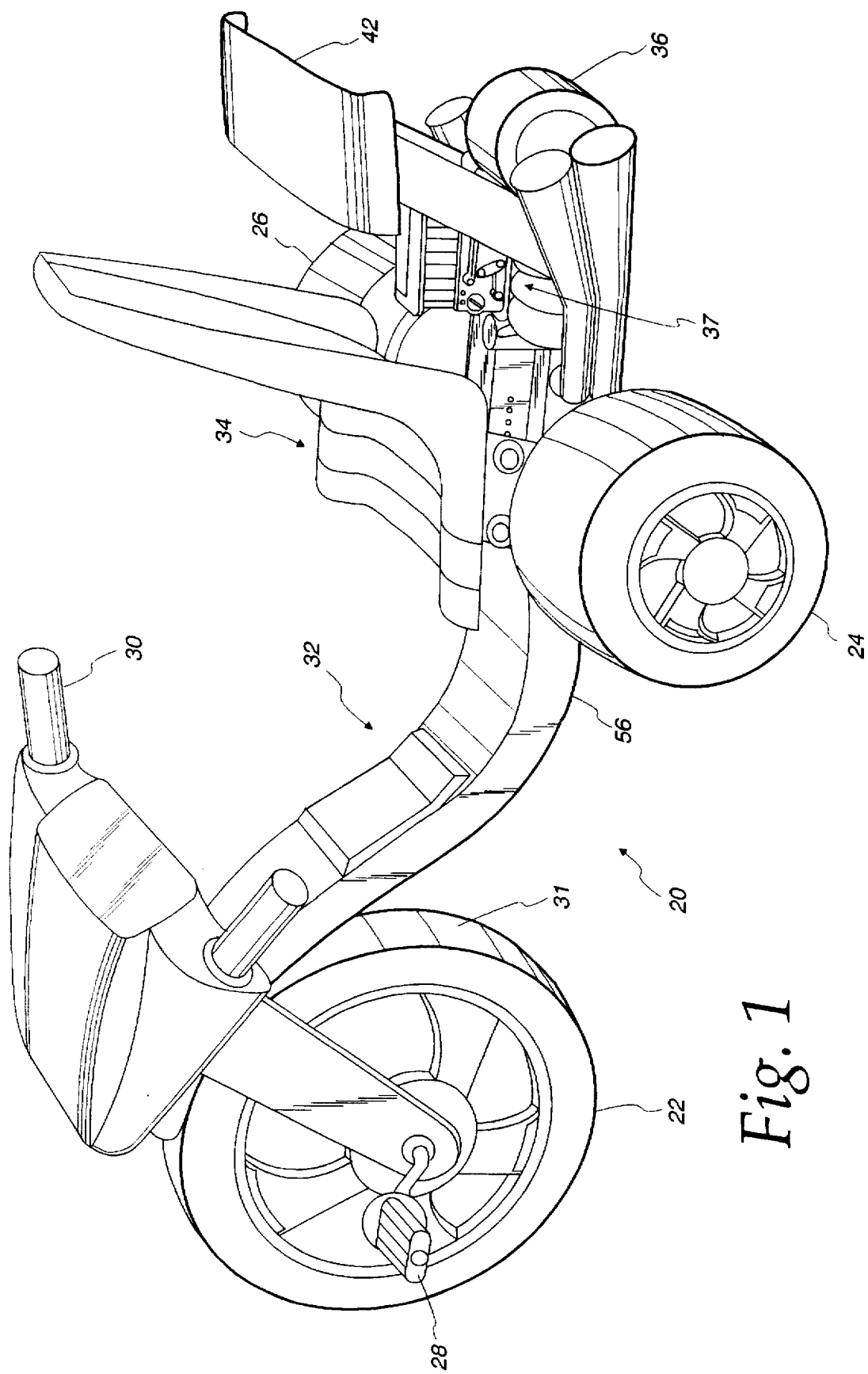
FIG. 1 is a perspective view of the inventive tricycle.

The inventive tricycle 20 (FIG. 1) includes the usual three wheels 22, 24, 26; pedals 28, and handle bars 30. These components are connected to a frame 32 built according to the present invention. The seat 34 has a back extending to protect the neck and head of a child from injury while going from a normal to a wheelie position.

In the back of the tricycle 20, a fourth wheel 36 is set high enough above the ground to play no part in either the support or the motion of the tricycle under normal conditions (FIG. 1A) when all three wheels 22, 24, 26 are on the ground. At this time, the center of gravity CG1 for the child and vehicle are well within the "footprint" of the conventional three wheels 22, 24, 26 which rest stably on the ground. However, with the child in seat 34, the center of gravity CG1 is close enough to the rear axle 40 (FIG. 2) for the back wheels 24, 26 to cause the tricycle to toggle back and be supported by the three wheels 24, 26, 36 if the child is leaning back (FIG. 1B) far enough to shift the center of gravity CG2 to be behind the axle 40. After the toggle action, the center of gravity CG2 is within the "footprint" of wheels 24, 26, 36 which now rest stably on the ground. The angle "A" is the allowed angle for the wheelie tip. The child is looking forward and seeing wheel 26 off the ground and in the air. He thinks that he is doing a wheelie.

Figure 1A:
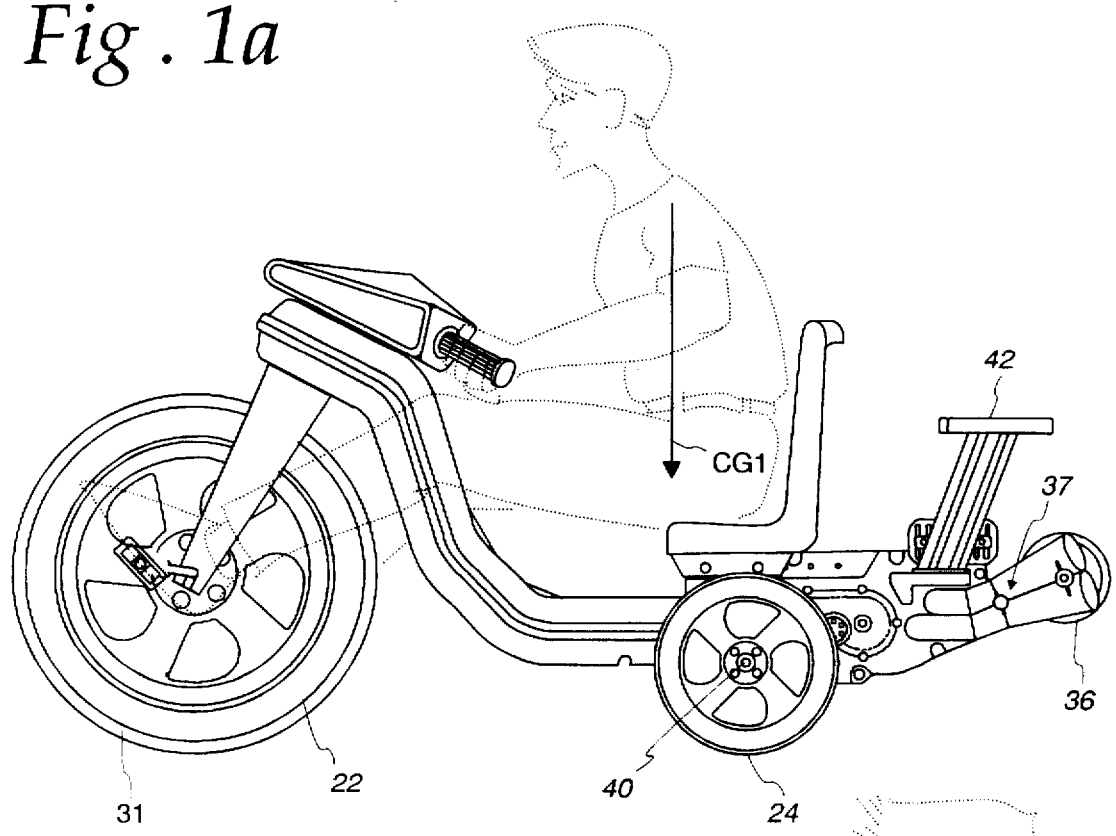
FIG. 1A shows the tricycle in a normal riding position.
Figure 1B:
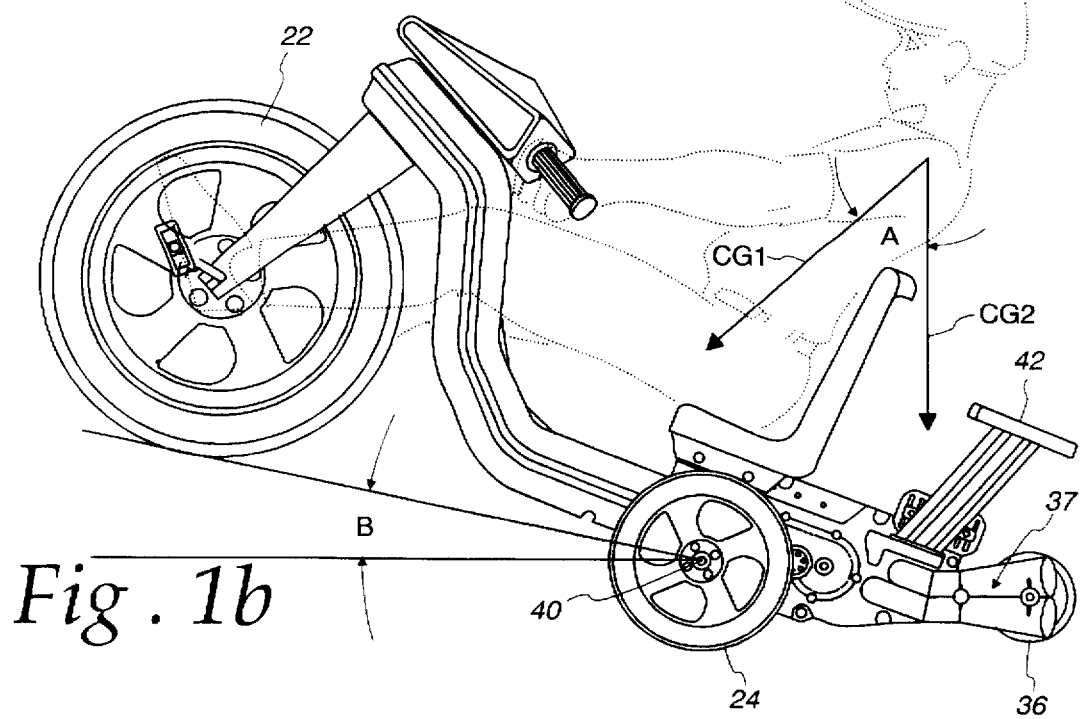
FIG. 1B is a similar showing of the same tricycle in a wheelie position.

Hence it is seen that FIG. 1 is actually showing a four wheeled vehicle having two stable positions which are schematically shown in FIGS. 1A, 1B. If the child leans forward to place the center of gravity in front of axle 40, the child is in a normal position (FIG. 1A) where an operation of pedals 28 propels the vehicle down the road. If he leans back to place the center of gravity behind axle 40, the toggle action occurs and the front wheel 22 raises far enough for the child to pretend that he is doing a wheelie. He can not propel the vehicle while in this position because the wheel 22 moved by pedals 28 is off the ground. However, he may pedal while in the normal position and as he is rolling, he can lean back, toggle over center, continue rolling while he does his wheelie, and then lean forward to toggle back over center to a normal forward position where he can continue to pedal and thus propel himself.

As compared to other tricycles of this general design, the traction of front wheel 22 is provided with means for increasing contact with the ground longer so that the child may continue propelling the tricycle until almost the instant of the toggle action. In this embodiment, a rubber, band-like tread 31 encircles the front wheel 22 to increase traction.

The toys of this type are generally made of plastic. The strength required, the desired appearance, and acceptable cost of any part determines whether that part is best made by one or another technique, such as injection molding, blow molding, or the like.

Figure 3:
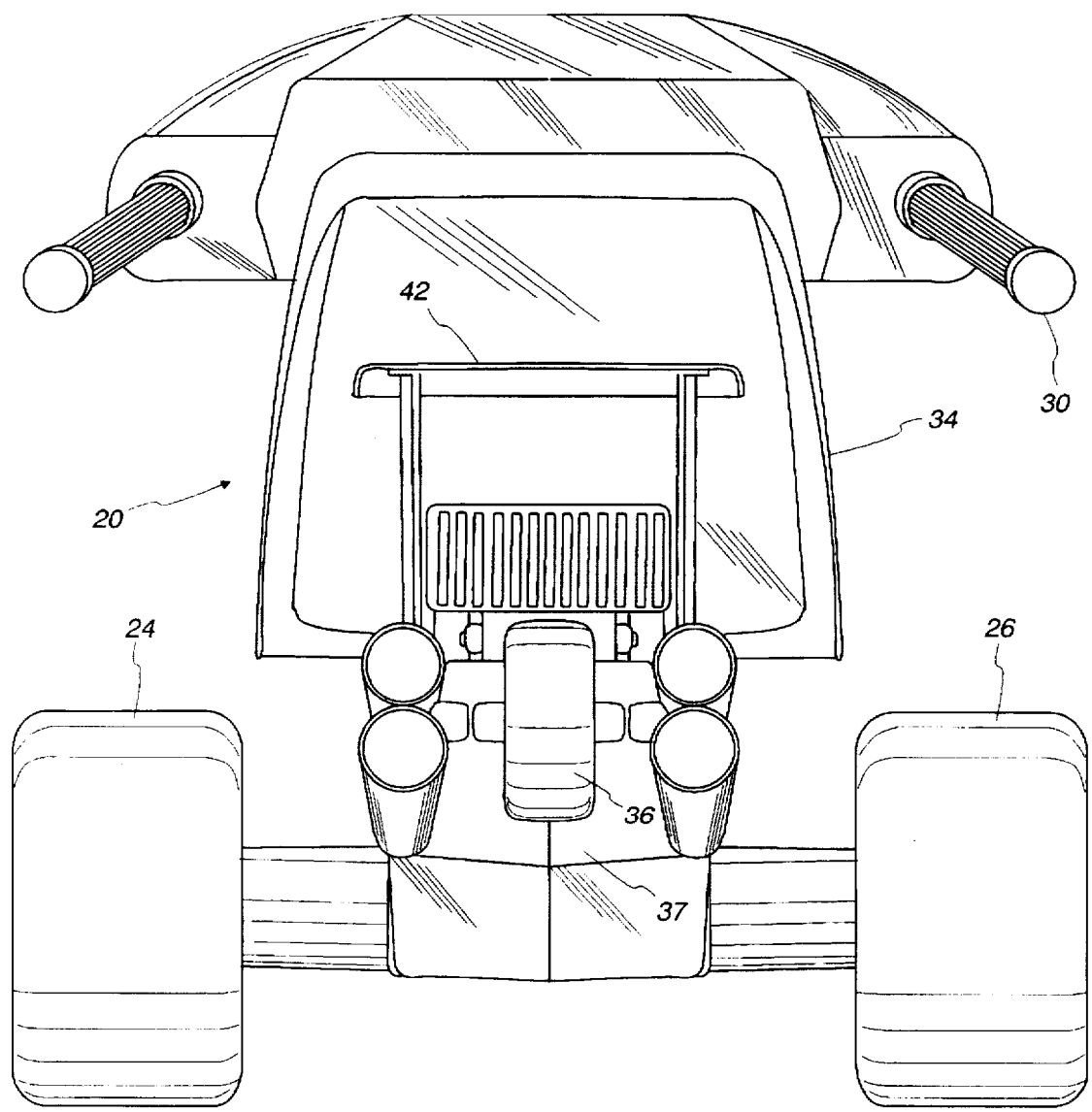
FIG. 3 is a back elevation of the tricycle.

For mounting the fourth wheel 36, parts 37 may best provide a disguise which makes the wheel look a little like the motor and exhaust system of a racing motorcycle. Even when looking directly at the back (FIG. 3) of this tricycle, the fourth wheel is not too obvious. This disguise contributes to the child's illusion that he is riding a motorcycle. To help further disguise the true nature of the fourth wheel and its supporting structure, a simulated "spoiler" 42 is combined with the "motor and exhaust".

The side elevation of FIG. 2 has the part forming the "motor" 37 removed, and part of rear wheel 24 broken away, in order to show how the positions of the seat and rear axle are adjusted and how the fourth wheel 36 is supported. In this side elevation it is seen that rear wheel 36 is elevated relative to the wheel 22; therefore, it is impossible for all four wheels to be on the ground simultaneously.

There are a series of notches (one of which is seen at 44) in the bottom of the frame 32. One of these notches is selected to receive the axle 40 of the rear wheel and thereby adjust the amount which the vehicle may tip as the front wheel 22 raises after the toggle action. The position of axle 40 is selected by loosening bolts 46 to drop the axle 40 below the series of notches 44, then the frame is slid to a selected position where the axle fits into a notch and then bolts 46 are tightened to clamp axle 40 into the newly selected notch.

More particularly, the length of the lever arm 48 between axle 40 for back wheels 24, 26 and axle 50 for the fourth wheel 36 remains constant irrespective of which of the notches in the frame 32, such as 44, are selected for receiving the axle 40. It has been found that the preferred maximum allowed angle of tip for a child of the anticipated age is about 22° on the basis of the child's age and physical ability.

The sensitivity of the tricycle to the shifting of the child's weight, and therefore the propensity for the tricycle to tip back in the toggle action to produce the wheelie, is adjusted by selecting the fore-and-aft position of the seat 34 and the axle 40. By loosening suitable fasteners 52, the seat may be selectively moved to any suitable ones of the holes 54, where the fasteners are again tightened.

If the center of gravity of the child is close enough to the axle 40, he is almost sitting on it so that almost any backward shift of gravity causes the toggle action to produce a wheelie. On the other hand, if the child's center of gravity is far enough forward of axle 40, the child might be able to shift his weight over the axle only when leaning back as far as he can.

Figure 4:
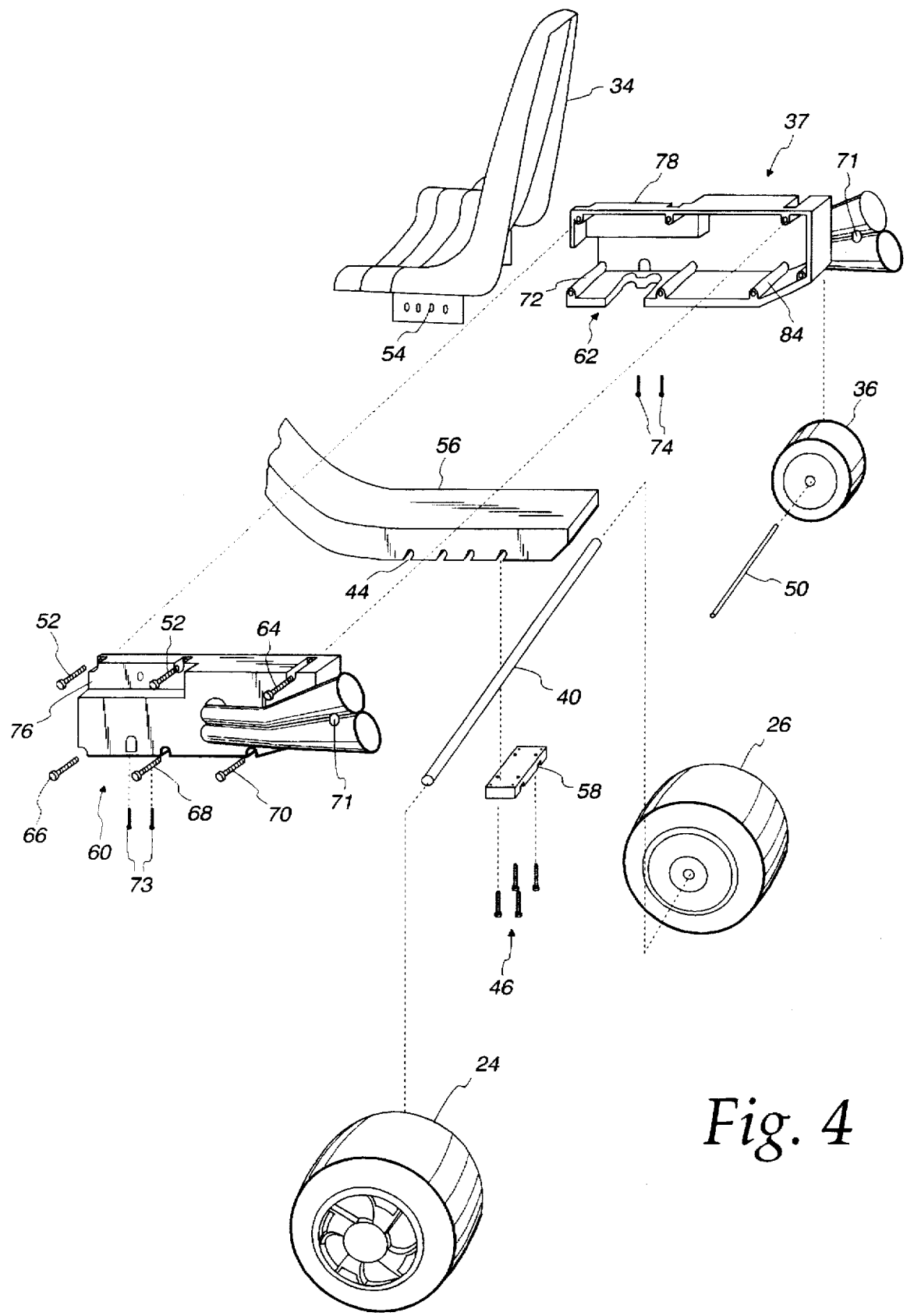
FIG. 4 is an exploded view of an adjustment mechanism for accommodating the tricycle to the physical growth of the child or to his increasing proficiency.

The construction of the inventive tricycle parts which provide these adjustments is best seen in FIG. 4. The frame 32 (FIG. 1) is formed in two parts. A first frame part 56 extends from the front toward the back of the tricycle and ends in a series of notches, such as at 44, any selected one of which may receive rear axle 40 which supports the rear tricycle wheels 24, 26. Once the axle 40 is in the selected notch, a plate 58 is secured into place by bolts 46 in order to capture the axle. To relocate the axle, the process is reversed, bolts 46 and plate 58 are removed, the axle 40 is moved to a different notch, and then plate 58 and bolts 46 are returned to again capture the axle.

The second frame part 37 supports the fourth back wheel 36. To increase the child's propensity to pretend, this frame part is configured to simulate a motor and exhaust system with surface features formed on the outside surfaces of two clam shells 60, 62 which fit over and embrace the first frame part 56. Opposite ends of axle 50 for the fourth wheel 36 are fitted into opposing holes or bearings 71, 71 in the clam shells 60, 62. The clam shells 60, 62 are fastened together by bolts 64, 66, 68 and 70 which fit into bosses, such as 72, 84 molded or otherwise formed inside the molded cavity of the clam shells. The relative location of the frame 56 and clam shells 60, 62 is fixed by bolts 73, 74.

After the clam shells 60, 62 are bolted together, seat 34 is placed over suitable recesses 76, 78 formed in clam shells 60, 62. The proper holes in seat 34 (such as 54) are selected from among a longitudinal series of holes. Then bolts 52, 52 secure the seat into place.

Figure 5:
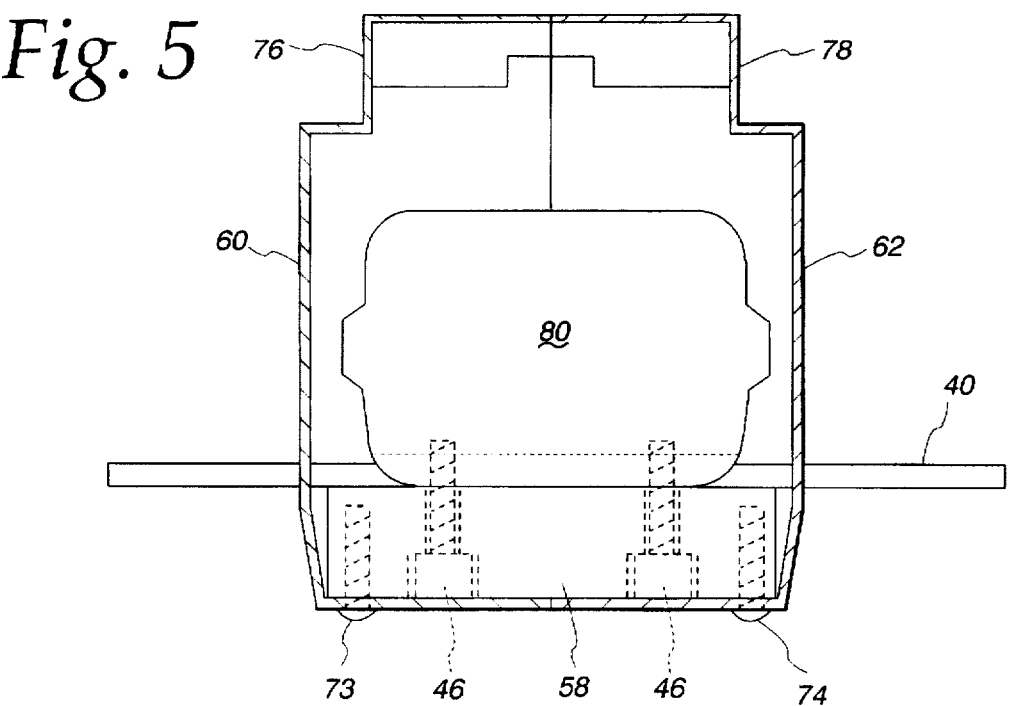
FIG. 5 is a cross section taken along line 5—5 of FIG. 6.
Figure 6:
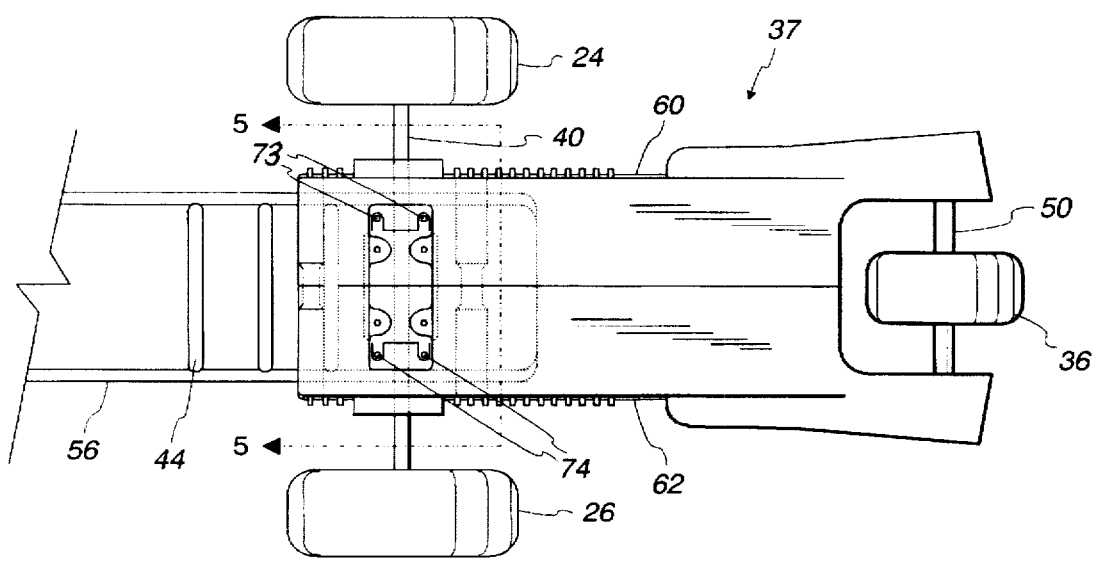
FIG. 6 is a bottom plan view which shows the junction between two parts forming the tricycle frame.

The frame 56 and clam shell parts 60, 62 of FIG. 4 are shown assembled in FIGS. 5 and 6. The frame part 56 (FIG. 6) slips longitudinally through a window 80 (FIG. 5) in the joined clam shells 60, 62. The window 80 is large enough to enable a relocation of axle 40, a process which is shown in the five stop motion views of FIGS. 7–11.

In FIG. 7, the frame part 56 is shown firmly attached to the clam shells 60, 62, by bolts 46. The rear axle 40 is in the rearmost notch 82. Although the lever arm 48 (FIG. 2) is constant, in the rear-most position, the amount which the front wheel can be tipped back is as great as it can be made, about 9" in this embodiment. In this condition, the tricycle is ready to ride.

Next, assume that the axle 40 is in the front-most notch 44. In this front-most position, the amount which the front wheel 22 can be tipped back is as slight as it can be made, about 7" in this embodiment. If the child desires to increase the amount the front wheel 22 can be tipped back, this is accomplished by lengthening distance 49 (FIG. 2) between the axle 40 and the axis of the front wheel 22, such as by moving the axle 40 from the front-most notch 44 to another selected notch further from the front wheel 22. As here shown, the selected notch 86 is next to the front notch 44 (FIG. 8) and further from the front wheel 22, and, if used, will cause the front wheel 22 to tip back further than when the axle is in the front-most notch 44.

To shorten the distance 49, referring to FIGS. 2 and 8, bolts 46 are removed and plate 58 is slid forward (Direction A). The thickness of plate 58 enables it to help support the rear end of the frame part 56, as it slides within the joined clam shells. The clam shells have a number of bosses 84 formed on the inside surface to receive bolts 66, 68, and 70 (FIG. 4). These bosses also help support the frame part 56 as it slides within the clam shells 60, 62.

The axle 40 may drop into the space formerly occupied by plate 58 after it slides forward. Then, the frame part 56 slides (FIG. 9) easily in Direction B so that the desired notch 86 is over axle 40. In this position, the tricycle may tip the front wheel up an amount which is next to the lowest amount possible. The tipping up of the front wheel forms an angle B (FIG. 1B), which will be referred to as the wheelie angle, measured from the axle 40 between the front wheel 22 and the ground. Of course, any other notch may also have been selected, which will vary the maximum amount the front wheel may be raised and, hence, will vary the wheelie angle B as well. The highest value for the wheelie angle B occurs when axle 40 is in the notch 82 which is the farthest rearward.

In FIG. 10, the axle 40 is raised into the selected notch 86 and plate 58 is slid (Direction C) to hold the axle in a raised position.

Finally, in FIG. 11, bolts 46 are tightened to again secure the axle 40 in place. The tricycle is again ready to ride.

In addition to the advantages apparent from the above description and drawings, the tricycle 20 according to the present invention has various other advantageous features. For example, the distance 48 between the axle 40 and the wheelie wheel axle 50 is fixed, which in turn means the angle A remains constant. As a result, no matter which notch the axle 40 is placed in, and no matter how the seat 34 is positioned relative to the axle 40, the child cannot rotate backward by more than the angle A. The manufacturer hence can select a value for the angle A which is acceptable for popping a safe, controllable wheelie, and no subsequent adjustment by the user will diminish the safety of the tricycle.

Those who are skilled in the art will readily perceive how to modify the invention. Therefore, the appended claims are to be construed to cover all equivalent structures which fall within the true scope and spirit of the invention.

The claimed invention is:

1. A wheelie tricycle for use on a planar surface comprising:

a frame including a front part and a rear part;

a pair of rear wheels sharing a common axis and rotatably mounted on said rear frame part;

a front wheel rotatably mounted on said front frame part;

a fourth wheel rotatably mounted on said rear frame part rearwardly of said pair of rear wheels and elevated above said pair of rear wheels whereby the tricycle may be tipped back and forth about the common axis in either of two stable positions, with the two rear wheels and the front wheel on the planar surface and the fourth wheel elevated above the planar surface in the first stable position, and the two rear wheels and the fourth wheel on the planar surface and the front wheel elevated above the planar surface in the second elevated position;

said front and rear frame parts having respective ends which are in horizontally telescoping relationship with each other when the tricycle is not in the second stable position to adjust the elevation of said front wheel when said tricycle is in the second stable position;

and means for selecting among a plurality of discrete telescoping positions of said frame parts relative to each other.

2. A wheelie tricycle as in claim 1 further comprising an axle for mounting said pair of rear wheels on said rear frame part, and wherein said means for selecting said telescoping position of said frame parts include:

a series of discrete notches formed on the telescoping portion of said front frame part, each of said notches being capable of capturing said axle of said pair of rear wheels when selected to do so;

a plate for trapping said axle in the selected notch;

and removable fastening means for securing a fixed portion of said rear frame part to said front frame part whereby to lock said frame parts together in the selected telescoping position;

said removable fastening means also securing said plate to said fixed portion of said rear frame part, and also securing said plate to said front frame part in position to lock said axle in the selected notch;

whereby said pair of rear wheels has a fixed position relative to said rear frame portion and a selectable position relative to said front frame portion.

3. The wheelie tricycle as in claim 1 further comprising a seat associated with the frame.

4. The wheelie tricycle as in claim 3 further comprising means for adjustably positioning the seat in any one of a plurality of seat positions relative to the pair of rear wheels independently of the position of the rear wheels with respect to the front wheel.

* * * * *